(12) United States Patent
Miyagawa

(10) Patent No.: US 6,269,902 B1
(45) Date of Patent: Aug. 7, 2001

(54) CONSTRUCTION FOR MOUNTING SUBFRAME TO VEHICLE BODY

(75) Inventor: Kazuo Miyagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,396

(22) Filed: Feb. 18, 2000

(30) Foreign Application Priority Data

Feb. 22, 1999 (JP) .................................................. 11-042965

(51) Int. Cl.⁷ .................................................. B62D 21/00
(52) U.S. Cl. .......................... 180/312; 296/30; 280/781; 280/796; 280/798
(58) Field of Search .................................. 280/781, 785, 280/796, 798; 180/312, 299; 296/203.02, 203.04, 194, 195, 203.01, 204, 205, 29, 30

(56) References Cited

U.S. PATENT DOCUMENTS

| | | | |
|---|---|---|---|
| 2,327,585 | * 8/1943 | Ulrich | 296/30 |
| 3,556,552 | * 1/1971 | Deckert | 280/781 |
| 5,040,917 | * 8/1991 | Camuffo | 403/408.1 |
| 5,862,877 | * 1/1999 | Horton et al. | 180/312 |
| 6,073,948 | * 6/2000 | Motojima et al. | 180/219 |

FOREIGN PATENT DOCUMENTS

| | | | |
|---|---|---|---|
| 01022623 | * 1/1989 | (JP) | . |
| 06263057 | * 9/1994 | (JP) | . |
| 09099867 | 4/1997 | (JP) | B62D/25/08 |
| 10258763 | 9/1998 | (JP) | B62D/21/00 |
| 10310081 | 11/1998 | (JP) | B62D/21/00 |
| 10324268 | * 12/1998 | (JP) | . |
| 10324270 | * 12/1998 | (JP) | . |
| 11105745 | * 4/1999 | (JP) | . |

* cited by examiner

*Primary Examiner*—Lanna Mai
*Assistant Examiner*—Ruth Ilan
(74) *Attorney, Agent, or Firm*—Sughrue, Mion, Zinn, Macpeak & Seas, PLLC

(57) ABSTRACT

A construction for mounting a subframe 1 to a vehicle body 5 includes a hollow collar 2 inserted into a pipe P constructing the subframe, the pipe being provided with an insertion hole 1*a* at a certain position along its thickness direction; a pair of substantially U-shaped brackets 3, 3 fixed to the pipe in such a manner that the hollow collar inserted through the insertion hole is held between the brackets; and a bolt 4 connecting the subframe to the vehicle body. The subframe may be mounted to the vehicle body at inclined angles. The brackets are mounted on the pipe such that a base portion 3*a* of each bracket is parallel in side view to a subframe mounting surface 5*a* of the vehicle body and allows the insertion of the bolt. The brackets are then fixed to the pipe at its side projecting portions 3*b*, 3*b*. One bracket adjacent to the vehicle body has a mounting surface 3*d* which allows surface contact with the subframe mounting surface of the vehicle body.

1 Claim, 6 Drawing Sheets

CONSTRUCTION FOR MOUNTING SUBFRAME TO VEHICLE BODY

FIELD OF THE INVENTION

The present invention relates to a construction for mounting a subframe to a vehicle body.

BACKGROUND OF THE INVENTION

Subframe construction is known for mounting an engine, suspensions and the like by partly mounting subframes to a vehicle body. Subframes are used in an area where enormous external force is exerted on a vehicle body, such as an engine-mounting space, suspension-mounting space and the like. Subframes are usually mounted at the bottom of a vehicle body at the front and the rear, respectively. For example in a front engine rear drive type vehicle, front suspensions and an engine are mounted on a front subframe at the front side of the vehicle body, and rear suspensions and a differential gear unit are mounted on a rear subframe at the rear side of the vehicle body.

As mentioned above, these subframes are used in an area where enormous external force is exerted. However, such external force is exerted on a connecting part between the subframe and the vehicle body as well. For this reason, construction for mounting a subframe is a very important factor for the design of a vehicle body. It is also necessary to ensure layout free structure since various equipment are mounted on a subframe. A subframe is often mounted to a subframe mounting surface of a vehicle body at inclined angles.

FIG. 6 shows a conventional construction for mounting a subframe to a vehicle body, in which FIG. 6A shows a mounting construction by the use of a bracket, and FIG. 6B shows a mounting construction by the use of a collar.

As shown in FIG. 6A, a bracket 53 provided with a bolt insertion hole and a pipe insertion sleeve is fitted onto one end of a pipe constructing a subframe and thereafter welded We. The subframe (pipe 51) is then mounted to a vehicle body 55 in such a way that the bracket 53 is fixed to the vehicle body 55 by a bolt 54. Meanwhile, as shown in FIG. 6B, a pipe 51 constructing a subframe is provided with an insertion hole. A hollow collar 52 is inserted into the insertion hole and thereafter welded We. The subframe (pipe 51) is then mounted to the vehicle body 55 by the insertion of a bolt 54 through the collar 52.

However, in the mounting construction shown in FIG. 6A, there is a space restriction since the bracket 53 is connected at the end of the pipe 51. The bracket 53 may be connected at an intermediate portion of the pipes 51. However, extensive mounting space is required. In either case, such a mounting construction is not preferable due to restriction of the layout space. The mounting construction shown in FIG. 6A also has a problem in its strength.

Meanwhile, the mounting construction provided with an insertion hole through the pipe 51 (FIG. 6B) is free from restriction of the layout space. However, since the subframe contacts to the vehicle body 55 merely at the collar 52 inserted through the pipe 51, contact area and contact width to the vehicle body become smaller, leading to insufficient mounting strength of the mounting construction against external force to be applied. Further, in the case that the subframe (pipe 51) is mounted to a subframe mounting surface 55a of the vehicle body 55 at inclined angles, the distance between the subframe mounting surface 55a and the center axis of a material constructing a subframe (pipe 51) becomes greater. This leads to decreased mounting strength as well as inaccurate positioning of the subframe.

Moreover, if the welded portion (weld We) of the bracket 53 or the collar 52 to the pipe 51 peels off, the subframe (pipe 51) may fall on the ground.

Further, the mounting construction should not be complicated in its structure in order to ensure simple manufacture and reduced cost.

In view of the above, the present invention seeks to provide a construction for mounting a subframe to a vehicle body, which ensures superior mounting strength and less mounting space requirement, and which facilitates inclined mounting of the subframe to the vehicle body.

SUMMARY OF THE INVENTION

With the foregoing drawbacks of the prior art in view, there is provided a construction for mounting a subframe to a vehicle body comprising: a hollow collar inserted into a pipe constructing the subframe, the pipe being provided with an insertion hole at a certain position along its thickness direction for the insertion of the hollow collar, and the insertion hole being substantially perpendicular to or inclined to the longitudinal axis of the pipe; a pair of substantially U-shaped brackets fixed to the pipe in such a manner that the hollow collar inserted through the insertion hole is held between the brackets, the bracket comprising a base portion having a bolt insertion hole at its center part in communication with the hollow collar and two side projecting portions extending from the base portion; and a bolt connecting the subframe to the vehicle body through the collar and the bolt insertion holes of the brackets, wherein said base portions of the brackets are parallel in side view to a subframe mounting surface provided on the vehicle body, and said brackets are mounted to the pipe so as to ensure the insertion of the bolt, and further said brackets are fixed to the pipe at least by their respective side projecting portions, and wherein one of said brackets to be directly in contact with the vehicle body provides a mounting surface at its outer surface of the base portion, and said mounting surface enables surface contact with the subframe mounting surface of the vehicle body.

With such construction, since the bracket is substantially U-shaped in profile having side projecting portions at both ends of the base portion and is fixed to the pipe at the side projecting portions, adjustment of the bracket can be carried out in the thickness (vertical) direction of the pipe, allowing mounting of the subframe to the vehicle body at optional angles. The collar functions as a spacer and a reinforcing material since it is positioned between the two brackets. Further, not like a contact merely between the collar and the vehicle body, the present invention provides a contact between the bracket fixed to the pipe and the vehicle body. This enables extensive contact area as well as extensive contact width. No increased mounting space is required.

The bracket functions as a reinforcing material of the subframe (pipe) together with the collar.

Further, since the base portion of each bracket is parallel to the subframe mounting surface of the vehicle body even if the subframe (pipe) is mounted to the vehicle body at inclined angles, the axis of the bolt to be inserted is held substantially perpendicular to the subframe mounting surface.

The term "substantially U-shaped brackets" means that the section thereof is substantially U-shaped, and it also includes a bracket having arcuate-shaped side projecting portions. The term "side projecting portions" means the side portions of the bracket, and the "base portion" connects the side projecting portions. Further, the term "surface contact" includes multipoint contact between the mounting surface of the bracket and the subframe mounting surface of the vehicle body.

BRIEF DESCRIPTION OF THE DRAWINGS

FIG. 4 shows mounting of the elements constructing a mounting construction of a subframe according to the invention, in which

FIG. 5 is a side sectional view showing mounting of a subframe according to the invention, in which

FIG. 6 shows a conventional construction for mounting a subframe to a vehicle body, in which

DESCRIPTION OF THE PREFERRED EMBODIMENTS

Preferred embodiments of the present invention will be described with reference to the attached drawings.

Figure 1:
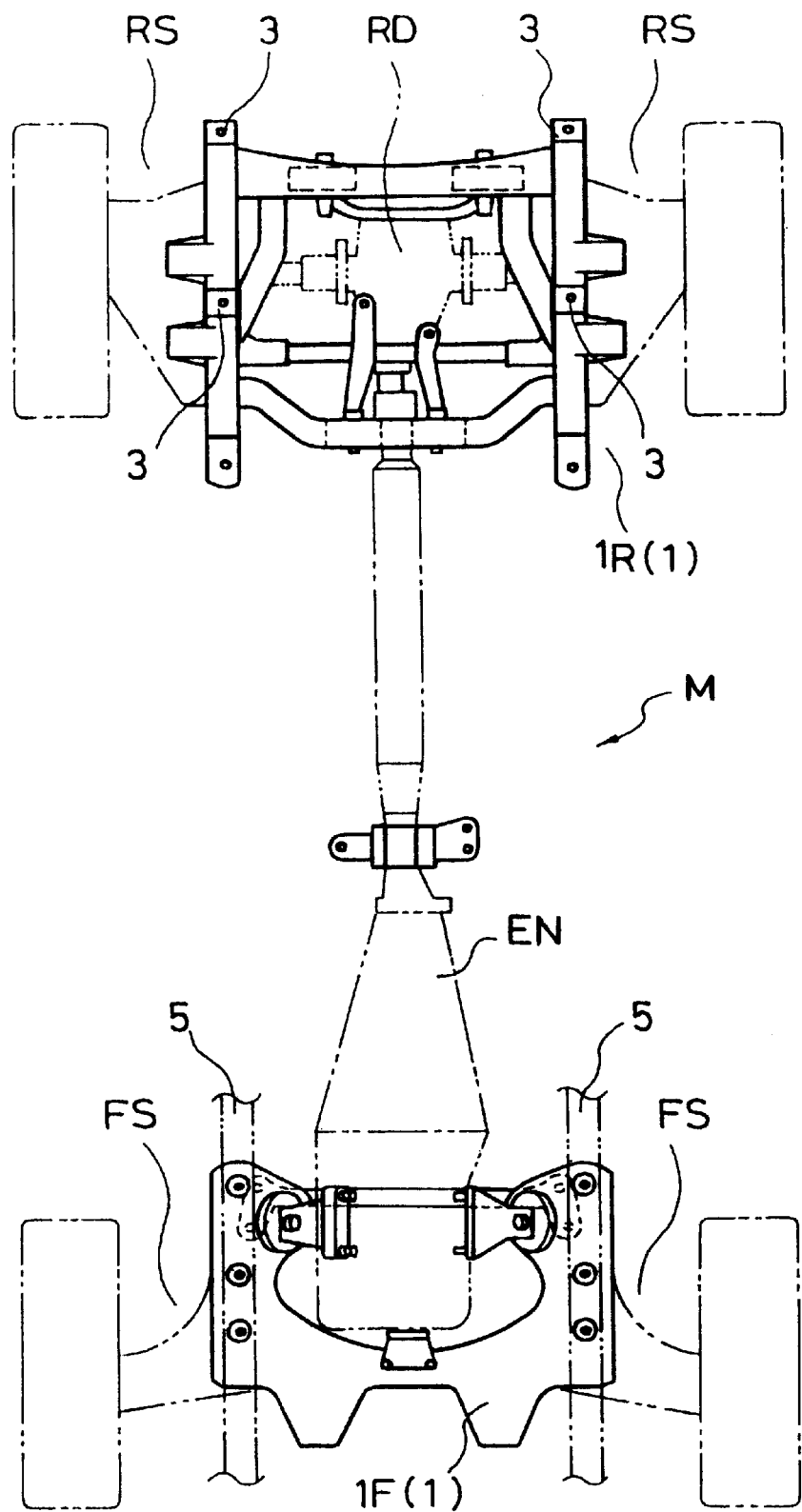
FIG. 1 is a schematic plan view showing an inner construction of a vehicle body.

As shown in FIG. 1, a vehicle body M is equipped with two subframes 1, 1. One subframe 1 positioned at the front is called as a front subframe 1F, while the other subframe 1 positioned at the rear is called as a rear subframe 1R. An engine EN shown in phantom and the like elements are mounted on the front subframe 1F, and also front suspensions FS, FS shown in phantom are attached thereto. Meanwhile, a deferential gear unit RD shown in phantom is mounted on the rear subframe 1R, and also rear suspensions RS, RS shown in phantom are attached thereto.

With reference to FIGS. 2 to 5, a mounting construction of a subframe to a vehicle body will be described. The construction for mounting a subframe 1 to a vehicle body 5 comprises a hollow collar 2 made of hollow material, a pair of substantially U-shaped brackets 3,3 and a bolt 4. Such a mounting construction is applicable to both front and rear subframes 1F, 1R. The following explanation will be made along a mounting construction applied to the rear subframe 1R.

The rear subframe 1R (hereinafter, the term "subframe 1" means "rear subframe 1R" unless specifically described) has a lattice-like framework construction made of hollow pipes P. However, the pipe P may be of any known shapes. For example, the pipe P may be a round or square pipe. The pipe P is made from steel, aluminum and the like material. There is no need to use hollow pipes P to a place where a mounting construction according to the invention is not applied to.

Figure 2:
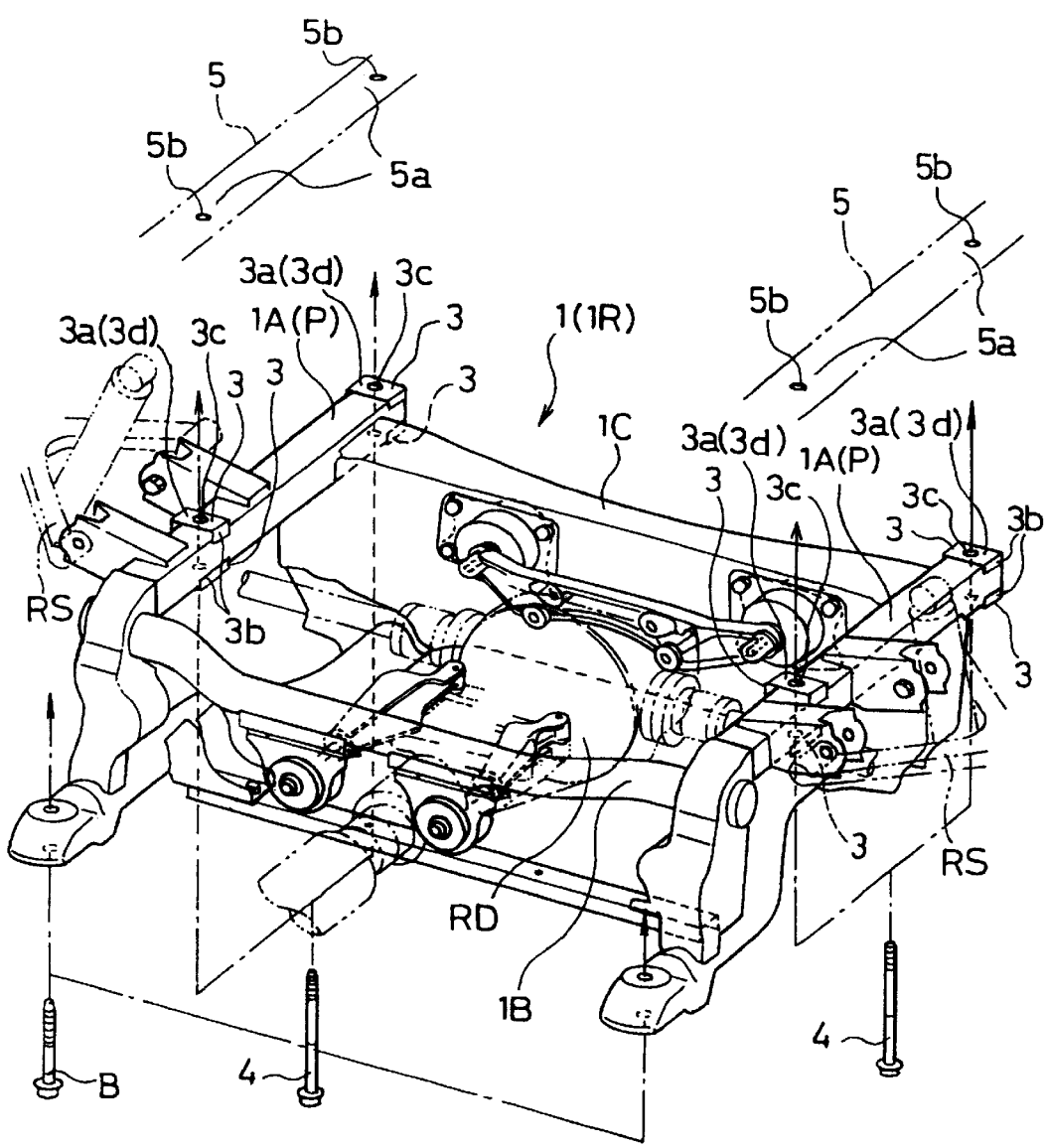
FIG. 2 is a perspective view showing a construction of a rear subframe, to which a mounting construction of a subframe according to the invention is applied.
Figure 3:
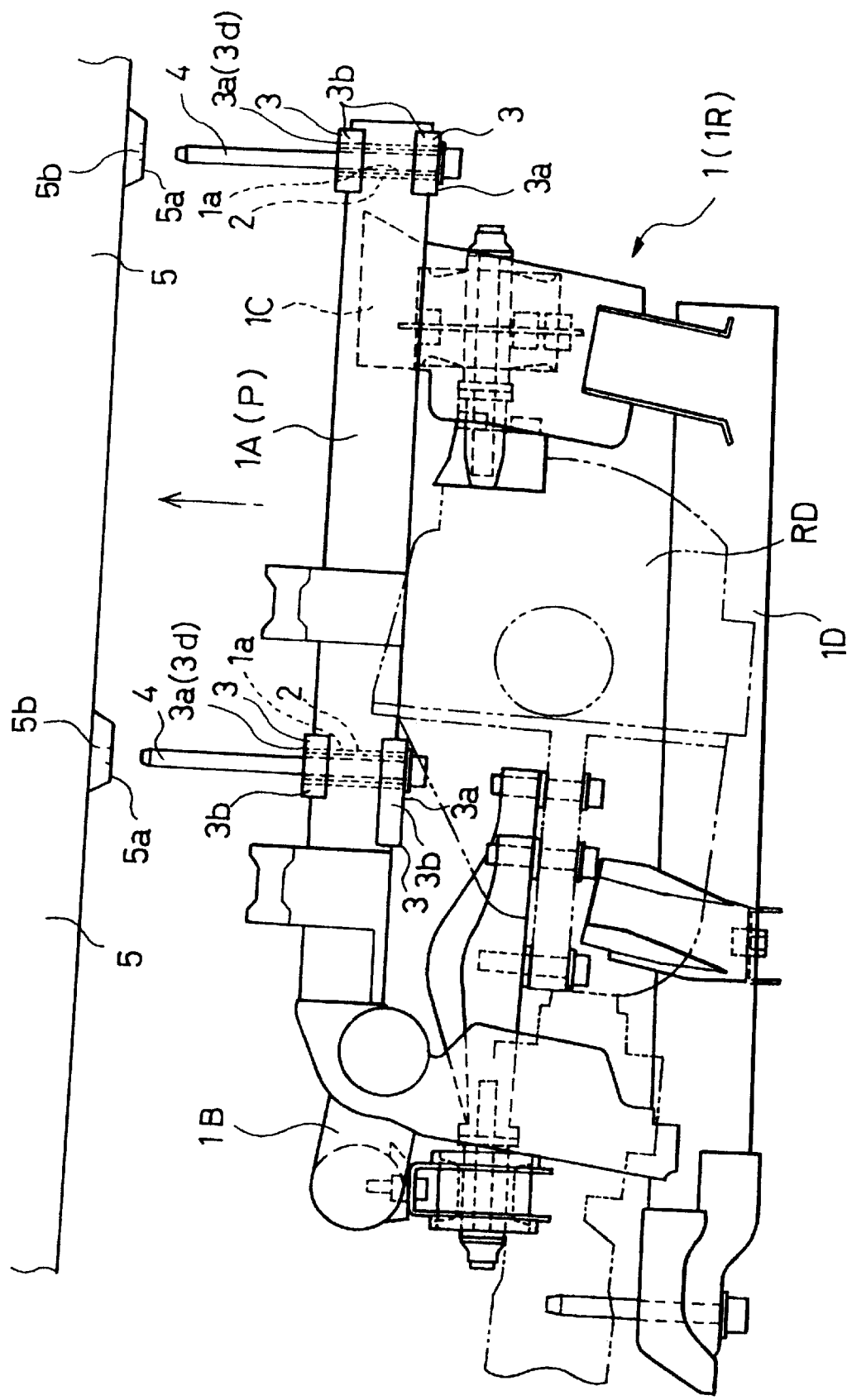
FIG. 3 is a side view of FIG. 2.
Figure 4A:
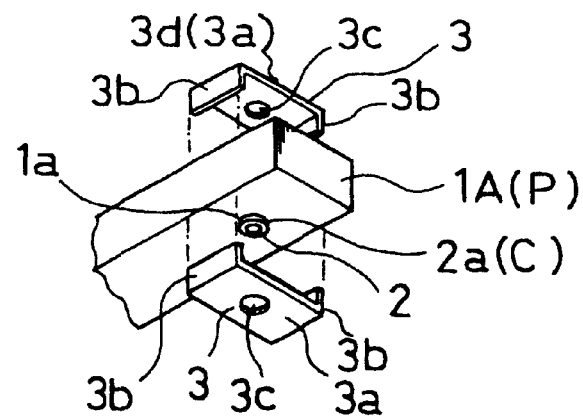
FIG. 4A is an exploded perspective view.
Figure 4B:
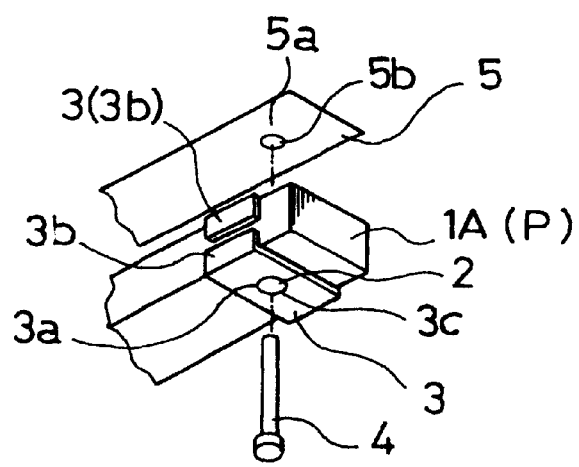
FIG. 4B is a perspective view showing the insertion of a bolt.
Figure 4C:
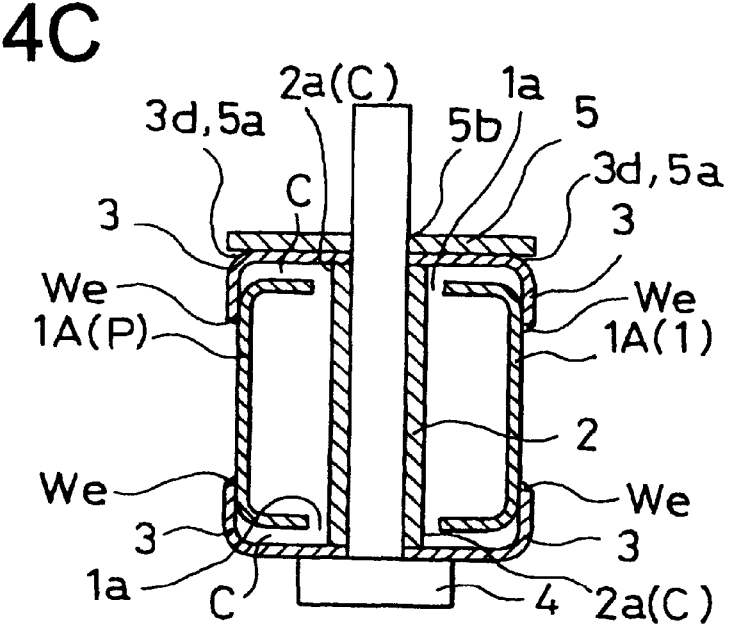
FIG. 4C is a sectional view of the mounting construction after inserting the bolt.

As shown in FIGS. 1 to 3, a subframe 1 of this embodiment comprises two side frames 1A, 1A, front frame 1B, rear frame 1C, and a bottom frame 1D. The two side frames 1A, 1A, front frame 1B and the rear frame 1C are assembled together so as to make a lattice-like framework construction viewing from the top. As mentioned above, the subframe 1 is provided with a deferential gear unit RD, rear suspensions and the like elements. In this embodiment, the side frame 1A is made of a pipe material P. The side frame 1A is provided with an insertion hole 1a at a certain position thereof, into which is inserted a collar 2 to be described later. A pair of brackets 3, 3 are fixed to the side frame 1A so as to ensure the insertion of a bolt 4. A mounting construction of the subframe is therefore constructed (FIG. 4). By way of this mounting construction, the subframe 1 is mounted to the vehicle body 5 (shown in FIG. 2 by phantom lines).

Figure 5A:
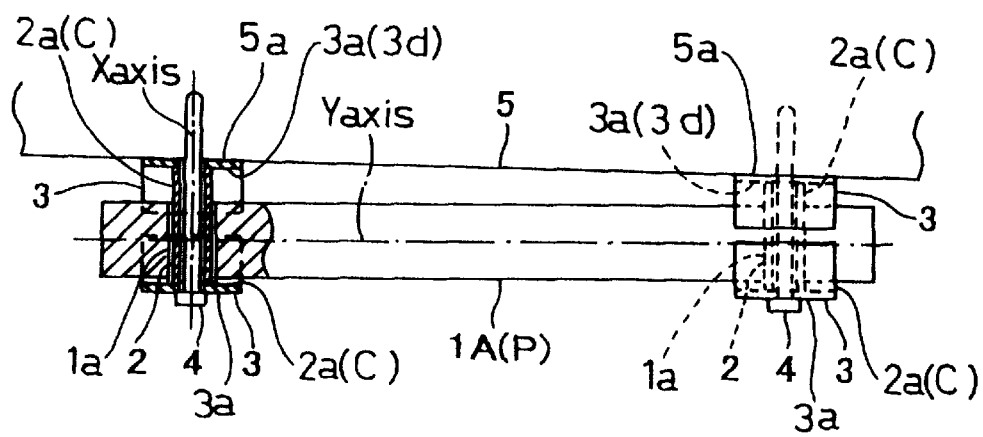
FIG. 5A shows a basic embodiment and FIG. 5B shows a modified embodiment.

The insertion hole 1a is made as a through hole, which is perpendicular to or inclined to the axis of the pipe P. As shown in FIG. 5A, the axis of the bolt 4 is retained substantially perpendicular to a subframe mounting surface 5a of the vehicle body 5 when the subframe 1 is mounted to the vehicle body 5.

As long as the mounting construction according to the invention is not applied, it is not necessary to use a pipe P. For example, the front frame 1B and the like may be made of other material.

The collar 2 will be described below.

As shown in FIG. 4, the collar 2 is made of hollow material.

The collar 2 is inserted into the insertion hole 1a of the side frame 1A ("pipe P" is hereinafter referred to as "side frame 1A"). The length of the collar 2 is greater than the thickness of the side frame 1A such that both ends of the collar 2 project outwardly from the side frame 1A after inserting the collar 2 into the side frame 1A. This is because the collar 2 also functions as a spacer with regard to the brackets 3, 3. Reference numeral 2a shown in FIG. 4 indicates an extended projection of the collar 2, which is outwardly extending from the top end or the bottom end of the side frame 1A. The length of each projection 2a, especially the length (height) of the projection 2a which is adjacent to the vehicle body 5 has an influence on the mounting angle between the subframe 1 and the vehicle body 5. The inner diameter of the collar 2 is decided so as to accept the insertion of the bolt 4.

The projections 2a, 2a of the collar 2 have a shape, which preferably enables surface contact with the inner surface of each base portion 3a to be described later in relation to the bracket 3. This is because the projections 2a, 2a function as a spacer and a reinforcing material (referring to FIG. 4C and the like).

As shown in FIG. 4, each bracket 3 is substantially U-shaped in section. Viewing from the top, the bracket 3 has a base portion 3a at the center and two side projecting portions 3b, 3b at both ends of the base portion 3a. As long as the objects of the invention can be achieved, the sectional shape of the side projecting portions 3b, 3b may be of any known shape. The base portion 3a is provided at its center part with a bolt insertion hole 3a for the insertion of the bolt 4.

The brackets 3, 3 are fixed to the side frame 1A at the top and the bottom sides of the side frame 1A in such a way that the bolt insertion holes 3a, 3a communicate with the collar 2, thereby allowing the insertion of the bolt 4. Even if the side frame 1A is mounted on the subframe mounting surface 5a at inclined angles, the base portion 3a of each bracket 3 is kept parallel in side view to the subframe mounting surface 5a.

The brackets 3, 3 are fixed to the side frame 1A at the respective side projecting portions 3b, 3b after positioning the brackets 3, 3. If the brackets 3, 3 are fixed to the side frame 1A by welding, contact portions between the side projecting portions 3b, 3b and the side frame 1A are welded.

The bolt 4 is a conventional bolt used for mounting the subframe 1 to the vehicle body 5. In order to insert the bolt 4, a bolt hole 5b is made in the subframe mounting surface 5a of the vehicle body 5. One end of the bolt 4 inserted through the bolt hole 5b is brought into engagement with a nut 7.

Figure 5B:
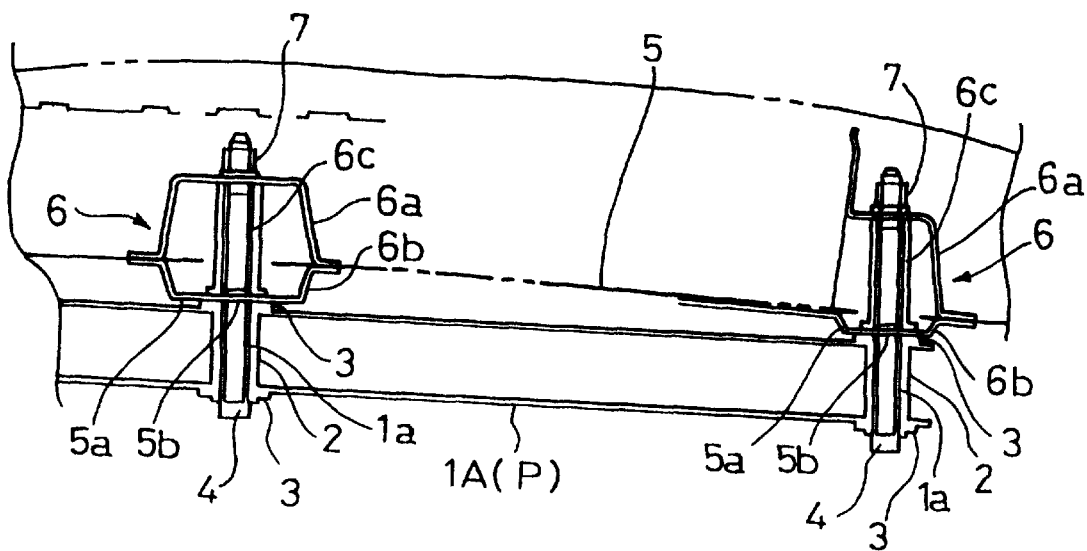
Figure 6A:
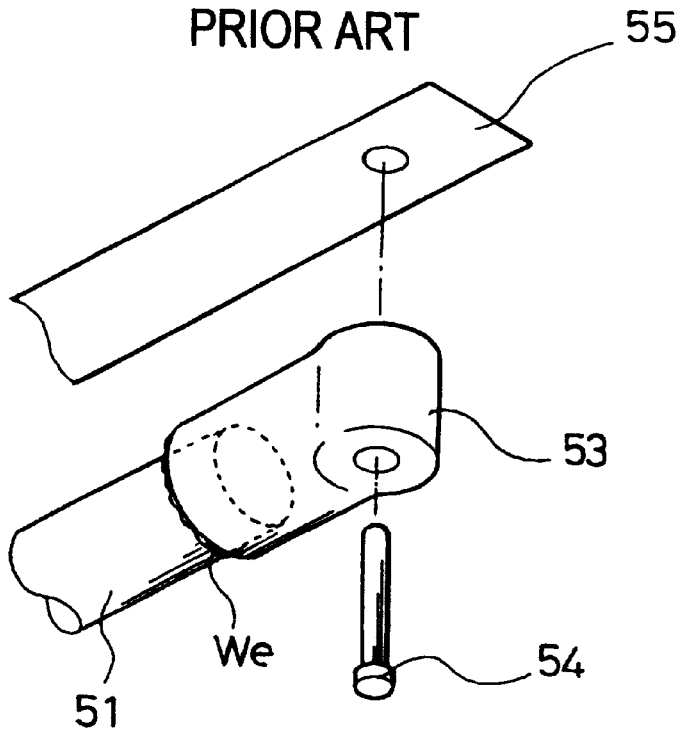
FIG. 6A shows a mounting construction by the use of a bracket.
Figure 6B:
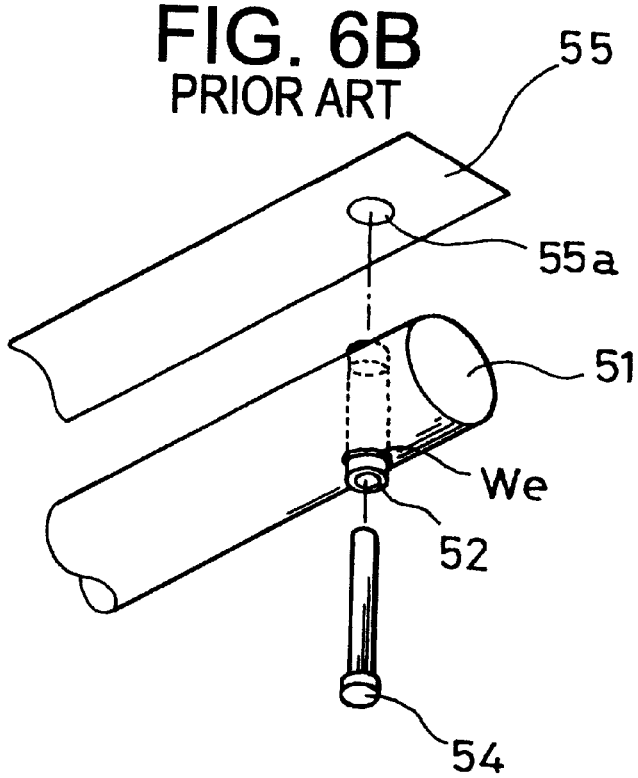
FIG. 6B shows a mounting construction by the use of a collar.

Such mounting may be carried out by the use of mounting brackets 6 shown in FIG. 5B. The mounting bracket 6 comprises an upper mounting bracket 6a and a lower mounting bracket 6b, and a collar 6c as a spacer is inserted therebetween. A part of the vehicle body 5 is held between the upper and the lower mounting brackets 6a, 6b. In this example, the bottom surface of the lower mounting bracket 6b corresponds to the subframe mounting surface 5a of the vehicle body 5, and a bolt insertion hole of the lower mounting bracket 6b corresponds to the bolt hole 5b of the vehicle body 5.

As shown in FIG. 5A, the side frame 1A (subframe 1) is often mounted to the subframe mounting surface 5a (vehicle body 5) at inclined angles. The inclined angle depends on the angle between the axis of the side frame 1A (Y axis) and the subframe mounting surface 5a.

When the subframe 1 (side frame 1A) is mounted to the vehicle body 5 (subframe mounting surface 5a) at inclined angles, the insertion hole 1a may be made so as to incline to the axis of the side frame 1A. However, it is not necessary to make an inclined insertion hole 1a if the insertion hole 1a is made to have a greater diameter.

As shown in FIG. 5A, notwithstanding the mounting angle between the Y axis and the subframe mounting surface 5a, the base portions 3a, 3a of the brackets 3, 3 are kept parallel in side view to the subframe mounting surface 5a. According to the invention, even if the side frame 1A has an arcuate profile, each bracket 3 is attached to the side frame 1A such that the base portion 3a thereof is kept parallel in side view to the subframe mounting surface 5a of the vehicle body 5.

Therefore, the axis of the bolt 4 (X axis) is kept substantially perpendicular to the subframe mounting surface 5a into which the bolt 4 is inserted. As a result, the subframe 1 (side frame 1A) is mounted to the vehicle body 5 without any bent or forcible distortion of other elements. Since the mounting surface 3d of the bracket 3 and the subframe mounting surface 5a of the vehicle body 5 ensures surface contact, the subframe 1 is firmly mounted to the vehicle body 5 at a higher rigidity.

Further, even if the weld We between the bracket 3 and the side frame 1A peels off, the bracket 3 will not fall on the ground. Precise positioning accuracy is also achieved with simple manner of operation.

Method for mounting the subframe 1 to the vehicle body 5 will be described bellow by way of an example. However, the following order may vary.

(1) A certain number of insertion holes 1a, 1a are made at certain positions along the vertical direction (thickness direction) of the side frame 1A. The insertion holes 1a, 1a have a greater diameter so that the collar 2 can be inserted at inclined angles.

(2) One of the brackets 3, 3 is placed on one end of the collar 2 so as to ensure the insertion of the bolt 4. The bracket 3 and the collar 2 are then fixed by projection welding (welded portions are not shown in the drawings). Positioning of the collar 2 with respect to the bracket 3 is carried out by the projection welding.

(3) The collar 2 fixed to the bracket 3 is inserted into the insertion hole 1a of the side frame 1A.

(4) A clearance C (gap) having a predetermined distance is formed between the inner surface of the base portion 3a of the bracket 3 and the outer surface of the side frame 1A. The bracket 3 is then fixed to the side frame 1A with the contact portions between the side projecting portions 3b, 3b and the side frame 1A welded. The clearance C corresponds to the height of the extended projection 2a, which is outwardly extending from the side frame 1A.

TIG welding or MIG welding may be used for welding the bracket 3 to the side frame 1A. Such welding is carried out after the axis of the collar 2 is positioned substantially perpendicular in side view to the subframe mounting surface 5a and further the base portion 3a of the bracket 3 is positioned parallel in side view to the subframe mounting surface 5a.

(5) The other bracket 3 is placed on the side frame 1. Adjustment of the clearance C between the bracket 3 and the outer surface of the side frame 1a is carried out, and at the same time the base portion 3a of the bracket 3 is kept parallel in side view to the subframe mounting surface 5a. Since the collar 2 functions as a spacer, positioning and adjustment of the bracket 3 will be facilitated. Like the bracket 3 fixed to the collar 2, this bracket 3 is also welded to the side frame 1A at the side projecting portions 3b, 3b.

(6) After the welding operation, the bolts 4, 4 . . . are inserted and the subframe 1 is mounted to the vehicle body 5. The bolt 4 is inserted through the lower bracket 3 positioned at the bottom of the side frame 1A, collar 2 (side frame 1A), upper bracket 3 positioned at the top of the side frame 1A, and the vehicle body 5. If necessary, the bolt 4 is further inserted into the mounting bracket 6 (FIG. 5). The bolt 4 is then brought into engagement with the nut 7.

The subframe 1 is therefore mounted to the vehicle body 5.

While the present invention has been described by way of specific examples, it is to be understood that changes and variations may be made without departing from the spirit or scope of the following claims.

What is claimed is:

1. A construction mounting a subframe to a vehicle body comprising:

a hollow collar inserted into a pipe constructing the subframe, the pipe being provided with an insertion hole at a certain position along its thickness direction for the insertion of the hollow collar, and the insertion hole being substantially perpendicular to or inclined to the longitudinal axis of the pipe; a pair of substantially U-shaped brackets fixed to the pipe in such a manner that the hollow collar inserted through the insertion hole is held between the brackets, each bracket comprising a base portion having a bolt insertion hole at its center part in communication with the hollow collar and two side projecting portions extending from the base portion; and a bolt connecting the subframe to the vehicle body through the collar and the bolt insertion holes of the brackets, wherein said base portions of the brackets are parallel in side view to a subframe mounting surface provided on the vehicle body, and said brackets are mounted to the pipe so as to ensure the insertion of the bolt, and further said brackets are fixed to the pipe at least by their respective side projecting portions, and wherein one of said brackets to be directly in contact with the vehicle body provides a mounting surface at its outer surface of the base portion, and said mounting surface enables surface contact with the subframe mounting surface of the vehicle body.

* * * * *